(12) United States Patent
Cloud et al.

(10) Patent No.: US 11,982,847 B2
(45) Date of Patent: May 14, 2024

(54) FLEXIBLE PUSH-PULL BOOT WITH A TRANSITION MEMBER

(71) Applicant: US Conec, Ltd, Hickory, NC (US)

(72) Inventors: Mitchell Cloud, Hickory, NC (US); Shubhrangshu Sengupta, Hickory, NC (US)

(73) Assignee: US Conec Ltd., Hickory, NC (US)

(*) Notice: Subject to any disclaimer, the term of this patent is extended or adjusted under 35 U.S.C. 154(b) by 0 days.

(21) Appl. No.: 17/570,846

(22) Filed: Jan. 7, 2022

(65) Prior Publication Data

US 2022/0196927 A1 Jun. 23, 2022

Related U.S. Application Data

(63) Continuation-in-part of application No. 17/126,493, filed on Dec. 18, 2020, now Pat. No. 11,474,308.

(60) Provisional application No. 63/234,617, filed on Aug. 18, 2021.

(51) Int. Cl.
*G02B 6/38* (2006.01)

(52) U.S. Cl.
CPC ......... *G02B 6/3893* (2013.01); *G02B 6/3821* (2013.01); *G02B 6/3825* (2013.01)

(58) Field of Classification Search
CPC ... G02B 6/3893; G02B 6/3821; G02B 6/3825
USPC .......................................................... 385/78
See application file for complete search history.

(56) References Cited

U.S. PATENT DOCUMENTS

| | | | |
|---|---|---|---|
| 8,559,781 B2 | 10/2013 | Childers et al. | |
| 9,989,712 B1 | 6/2018 | Takano et al. | |
| 10,114,180 B2 | 10/2018 | Suzic | |
| D860,142 S | 9/2019 | Childers et al. | |
| 10,520,685 B2 | 12/2019 | Watanabe | |
| 10,663,678 B2 | 5/2020 | Andres | |
| 10,705,300 B2 | 7/2020 | Takano et al. | |
| 2012/0057826 A1 | 3/2012 | Katoh | |
| 2013/0343706 A1 | 12/2013 | Droesbeke et al. | |
| 2020/0150357 A1* | 5/2020 | Higley | G02B 6/3893 |
| 2020/0278502 A1 | 9/2020 | Baelen | |
| 2021/0191053 A1 | 6/2021 | Cloud et al. | |

FOREIGN PATENT DOCUMENTS

WO  2020252048 A1  12/2020

* cited by examiner

*Primary Examiner* — Jerry M Blevins
(74) *Attorney, Agent, or Firm* — Michael L Leetzow PLLC; Shubhrangshu Sengupta

(57) ABSTRACT

A push-pull boot for an MPO fiber optic connector has rear portion, a middle portion, a transition portion disposed therebetween, at least two front extensions extending from the middle portion and a cross bar between the at least two front extensions. The push-pull boot has a spine that extends from an end of a rear portion to the transition portion and parallel to a longitudinal axis. The push-pull boot may also have a rear facing surface that is configured to engage a forward facing surface on the outer housing during a pulling operation. It may also have a spring push seat located in the middle portion of the push-pull boot and configured to engage a spring push of the MPO fiber optic connector during a pushing operation of the MPO fiber optic connector.

16 Claims, 21 Drawing Sheets

FLEXIBLE PUSH-PULL BOOT WITH A TRANSITION MEMBER

REFERENCE TO RELATED CASE

This application claims priority under 35 U.S.C. § 119 (e) to U.S. provisional application No. 63/234,617 filed on Aug. 18, 2021, and under 35 U.S.C. § 120 to U.S. patent application Ser. No. 17/126,493, filed on Dec. 18, 2020, the contents of which are hereby incorporated by reference in their entirety.

BACKGROUND OF THE INVENTION

In buildings where fiber optic connectors are being installed, there is a limited amount of space in which fiber optic connectors can be installed. In order to increase the number of fiber optic connectors to meet the increasing demand, there either needs to be more space or the fiber optic connectors need to be smaller. As the fiber optic connectors become smaller, it is more difficult to install and remove them. In order to remove them, one has to grab either an outer sleeve or a tab that is attached to an outer sleeve of the fiber optic connector. This is becoming increasingly difficult as the fiber optic connectors become smaller and the installations become denser. Additionally, optical fibers can become tangled around the tabs that are used to remove the connectors. One other structure that may be used to install fiber optic connectors is the strain relief boot. An installer can push on the boot, which in turn exerts a force on the fiber optic connector to secure it in a receptacle. However, pulling on a boot, particularly one that does not have the appropriate connections to the fiber optic connector, may damage the fiber optic connector if it is used to remove the fiber optic connector. Boots are not typically connected to the outer housing, which is used to disengage the fiber optic connector from the receptacle.

Thus, there is a need for a boot that can be used to insert into and remove from a receptacle a fiber optic connector that does not pinch the optical fibers, destroy the boot, or damage the fiber optic connector.

SUMMARY OF THE INVENTION

The present invention is directed to a push-pull boot for an MPO fiber optic connector, the MPO fiber optic connector having an outer housing, the push-pull boot that includes a rear portion, a middle portion, a transition portion between the middle portion and the rear portion, at least two front extensions extending forwardly from the middle portion and away from the transition portion, and at least one cross bar between the at least two front extensions, the push-pull boot having a rear facing surface on the at least one cross bar to engage the outer housing of the MPO fiber optic connector.

In some embodiments, the at least two front extensions comprise four front extensions extending forwardly from the middle portion and the at least one cross bar comprises two cross bars, a first of the two cross bars joining two different front extensions than a second of the two cross bars.

In some embodiments, the at least two front extensions include only two front extensions on a same side of the middle portion and the at least one cross bar includes only one cross bar between the only two front extensions.

In some embodiments, wherein the rear facing surface is configured to engage a forward facing surface on the outer housing during a pulling operation.

In other embodiments, the push-pull boot has a longitudinal axis and a spine extends from an end of the rear portion to the transition portion and parallel to the longitudinal axis.

In yet another aspect, there is a push-pull boot for an MPO fiber optic connector, the MPO fiber optic connector having an outer housing, the push-pull boot includes a rear portion, a middle portion, a transition portion between the middle portion and the rear portion, a plurality of front extensions extending forwardly from the middle portion, and two cross bars, each cross bar joining two of the plurality of front extensions to each other, the push-pull boot having at least one rear facing surface to engage the outer housing of the MPO fiber optic connector.

In some embodiments, the at least one rear facing surface engages the outer housing at a forward facing surface on a longer side of the outer housing.

In some embodiments, the plurality of front extensions comprise four front extensions extending forwardly from the middle portion and a first of the two cross bars joining two different front extensions than a second of the two cross bars.

In other embodiments, the rear facing surface is provided on each of the cross bars, and both of the two cross bars are configured to engage forward facing surfaces on the outer housing during a pulling operation In some embodiments, the push-pull boot has a longitudinal axis and is flexible in a direction away from the longitudinal axis between an end of the rear portion to the transition portion and is not flexible in a direction parallel to the longitudinal axis.

In yet another aspect, there is a push-pull boot for an MPO fiber optic connector, the MPO fiber optic connector having an outer housing, the push-pull boot that includes a rear portion, a transition portion forward of the rear portion, a middle portion forward of the transition portion, and a pair of front extensions extending forwardly from a top side and a bottom side of the middle portion, the push-pull boot having a rear facing surface at a front end of the front extensions to engage a forward facing surface of the outer housing of the MPO fiber optic connector, the outer housing having no openings on an outer surface thereof at the rear portion It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Figure 1:
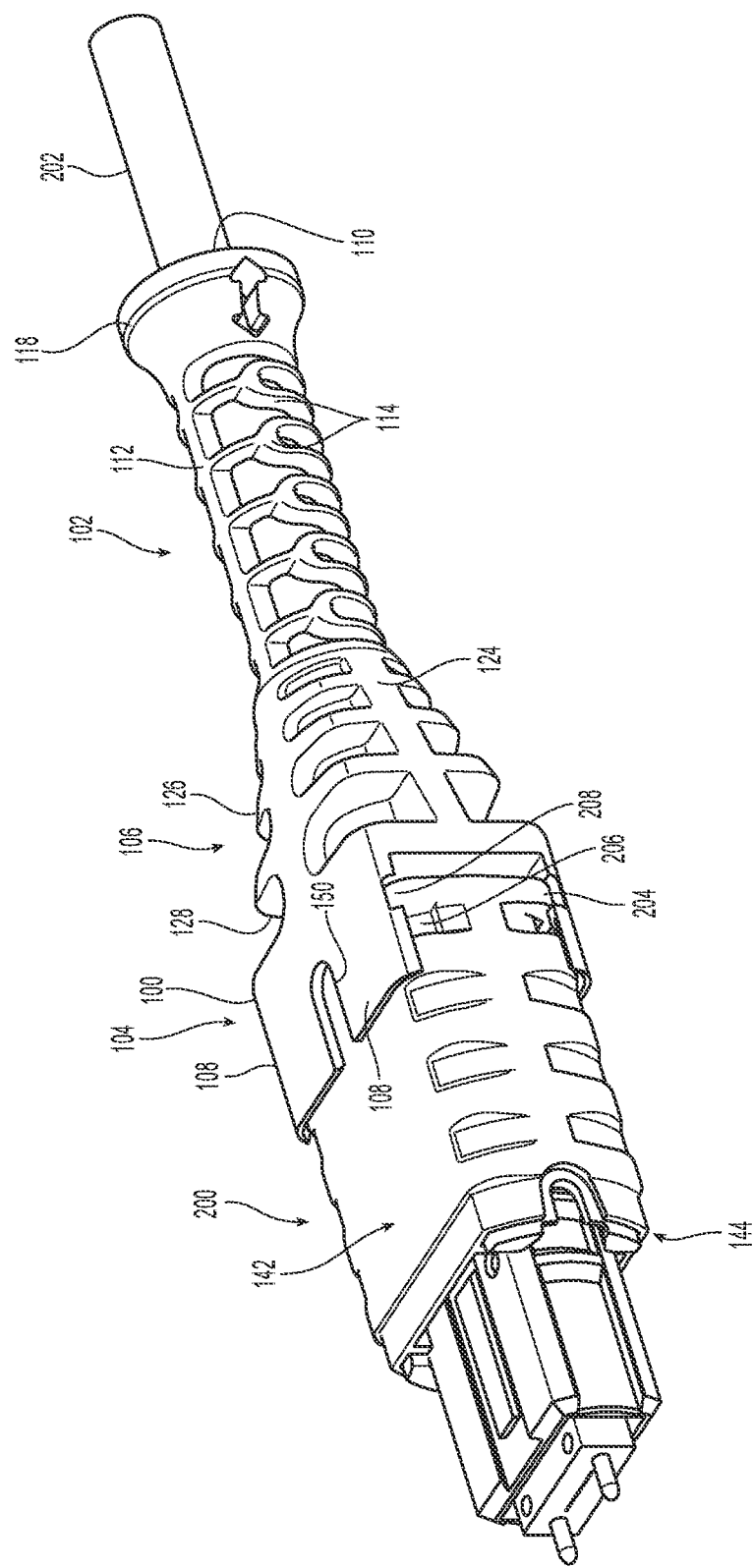
FIG. 1 is a perspective view of one embodiment of a flexible boot for a fiber optic connector according to the present invention, the flexible boot attached to a fiber optic connector.

Reference will now be made in detail to the present preferred embodiment(s) of the invention, examples of which are illustrated in the accompanying drawings. Whenever possible, the same reference numerals will be used throughout the drawings to refer to the same or like parts.

Applicant notes that the term "front" or "forward" means that direction where the fiber optic connector and/or the ferrule would meet with another fiber optic connector or device, while the term "rear" or "rearward" is used to mean the direction from which the optical fibers enter into the fiber-optic ferrule, the fiber optic connector, or the ferrule push. Each of the components will therefore have a front and rear, and the two fronts or forward portions of the fiber optic ferrules would engage one another. Thus, in FIG. 1, the "front" of the fiber optic connector and the flexible boot is on the left side and "forward" is to the left and out of the page. "Rearward" or "rear" is that part of the fiber optic connector or flexible boot that is on the right side of the page and "rearward" and "backward" is toward the right and into the page. This holds true for the embodiments in FIGS. 7 and 19 as well.

One embodiment of a flexible boot 100 attached to a fiber optic connector 200 with an optical fiber cable 202 is illustrated in FIG. 1. The fiber optic connector 200 has a housing 204 (or sleeve), the housing 204 has slots or openings 206 in the housing and therefore also has projections or ribs 208 that extend outward from the housing 204. The housing 204 may be similar to the sleeve in U.S. Pat. No. D860,142, owned by the applicant of this application. The contents of that patent are incorporated herein by reference. The fiber optic connector is illustrated to be an MPO connector, but other configurations of fiber optic connectors may also be used.

The flexible boot 100 has a rear portion 102, a middle portion 104, a transition portion 106 disposed between the rear portion 102 and the middle portion 104, and a plurality of front extensions 108 extending forwardly from the middle portion 104.

The rear portion 102 extends between a rear end 110 and the transition portion 106. The rear portion 102 has a spine 112 and a plurality of ribs 114. The spine 112 extends from the rear end 110 to the transition portion 106 and is parallel to the longitudinal axis A. See FIG. 3. The plurality of ribs 114 generally extend around the rear portion 102. This configuration allows for the flexible boot 100 to flex in all directions except along the longitudinal axis A and towards the transition portion 106 and a front end 116 of the flexible boot 100. The rear portion 102 also includes a grasping portion 118 at the rear end 110. As discussed in more detail below, the spine 112, the ribs 114, and the grasping portion 118 combine to form a portion of a central opening 120. See, e.g., FIG. 3.

Figure 2:
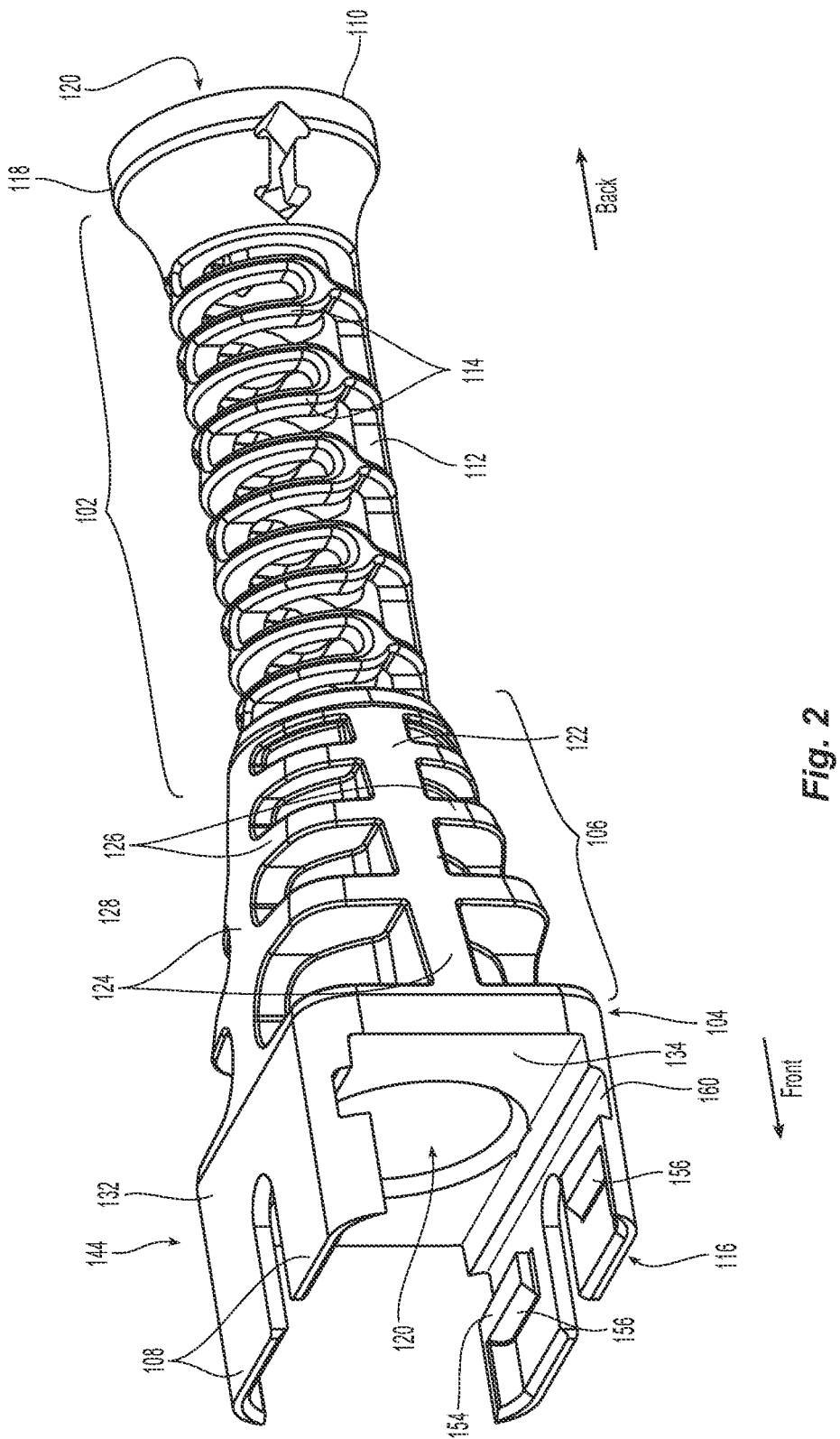
FIG. 2 is a perspective view of the flexible boot for a fiber optic connector in FIG. 1 in an inverted position.
Figure 3:
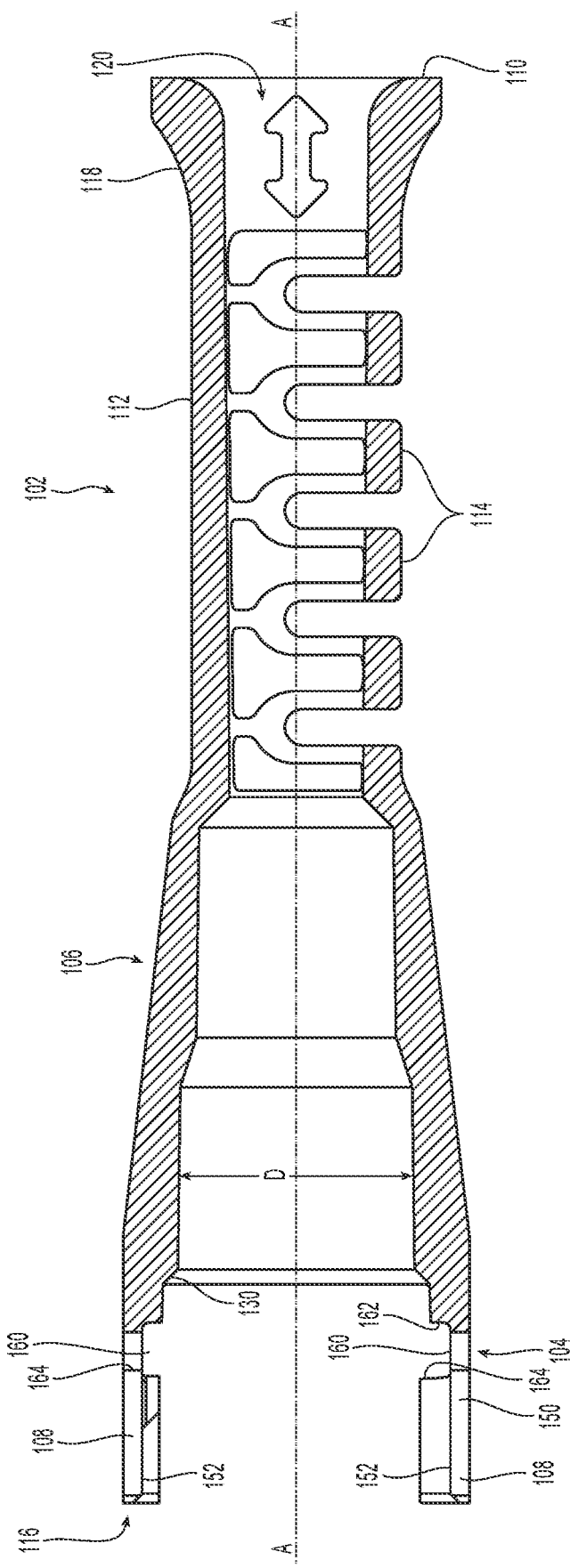
FIG. 3 is an elevation view of a cross-section of the flexible boot for a fiber optic connector in FIG. 1.
Figure 4:
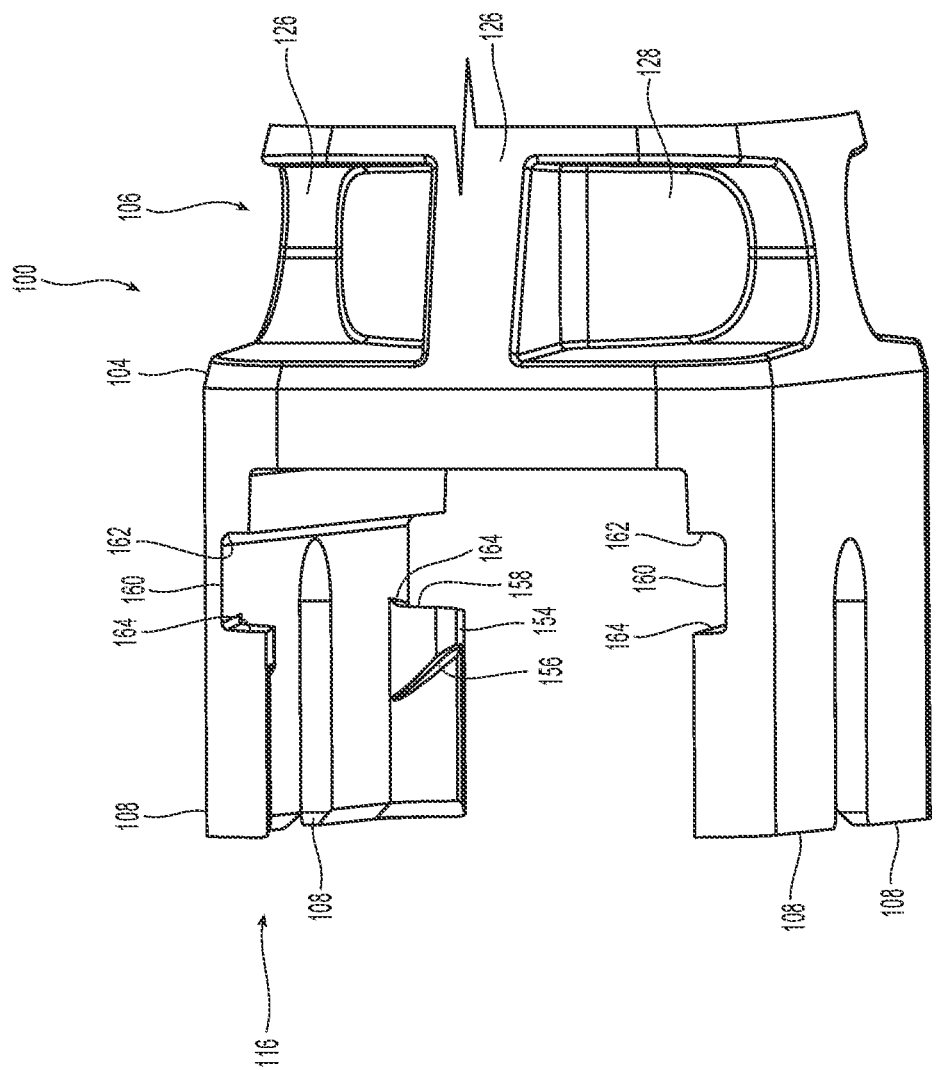
FIG. 4 is an enlarged perspective view from the bottom of the front end of the flexible for a fiber optic connector in FIG. 1.

The transition portion 106 is disposed between the rear portion 102 to the middle portion 104. The transition portion 106 becomes larger moving from the rear portion 102 to the middle portion 104. Preferably, the exterior surface 122 has a number of central members 124 that extend from the rear portion 102 towards the middle portion 104 and generally in a direction parallel to the longitudinal axis A. The central members 124 have a plurality of cross members 126 extending therebetween. The cross members 126 generally extend around the transition portion 106 (and generally orthogonal to the longitudinal axis A) and have gaps 128 between each of the cross members 126. As seen in FIGS. 2 & 3, the transition portion 106 extends the central opening 120 from the rear portion 102 through the transition portion 106. Preferably, the central opening 120 has a diameter D that varies along the length of the central opening 120. It is preferable that the diameter D decreases overall from a front portion 130 of the transition portion 106 to the rear end 110. This reduction assists with the management of the optical fiber cable 202 as it runs from the rear end 110 to the front end 116 of the flexible boot 100 and it will also accommodate a crimp body (not shown).

Forward of the transition portion 106 is the middle portion 104. The middle portion 104 circumferentially surrounds the central opening 120 at the front portion 130, and has an outer surface 132 and an interior surface 134. The middle portion 104 also includes a forward facing surface 136.

Extending from the middle portion 104 are a plurality of front extensions 108. As illustrated in the figures, the flexible boot 100 has four of the front extensions 108. Two of the front extensions 108 are on a top side 142 of the fiber optic connector 200 and two of the front extensions 108 are on a bottom side 144 of the fiber optic connector 200. The top and bottom sides (142,144) are in reference to the longer side of the fiber optic connector 200. Separating the front extensions 108 on each of the sides of the fiber optic connector 200 are cut outs 150. As illustrated in the figure, the cut outs 150 extend from the front end 116 rearwardly toward the middle portion 104. The cut outs 150 allow the front extensions 108 to slightly deform to slide over the housing 204. The deeper the cut outs 150, the more flexible the front extensions 108 are to allow for the engagement with the housing 204.

Each of the front extensions 108 has an interior surface 152 facing an opposing interior surface 152 of the opposing front extensions 108. Extending upward from interior surfaces 152 may be inward extending projections 154. The inward extending projections 154 preferably have a forward facing ramp 156 and a flat rearward facing surface 158. The rearward facing surface 158 faces the middle portion 104. While only two of the front extensions 108 are illustrated as having the inward extending projections 154, it is possible to have more or fewer thereof. The forward facing ramp 156 would engage the housings 204 and cause the front extensions 108 to flex upward as the housing is pushed on by the flexible boot 100, thereby allowing the housing 204 to be disposed behind the inward extending projections 154.

Figure 5:
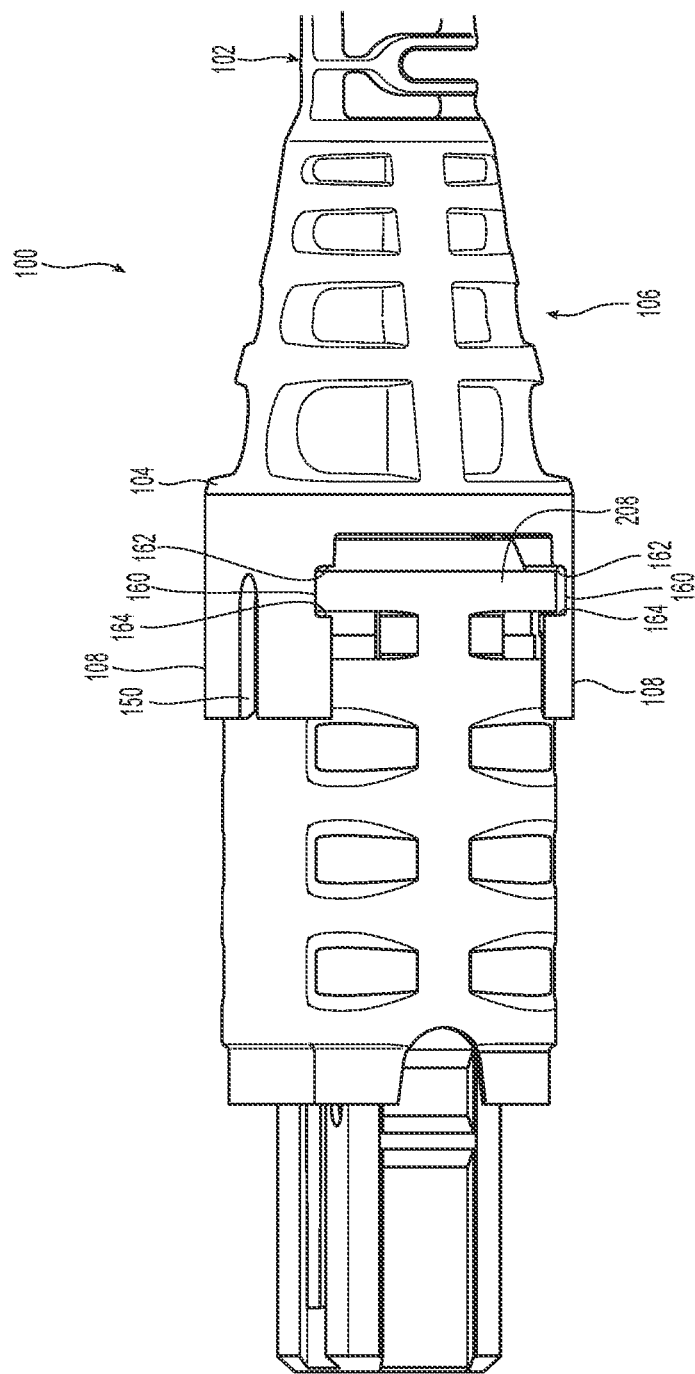
FIG. 5 is a Side elevation view of the flexible boot in FIG. 1 engaging the housing of a fiber optic connector.

The front extensions 108 on each of the sides (142, 144) may each have a transverse groove 160 that extends between the short sides of the flexible boot 100 and the fiber optic connector 200 and between the inward extending projections 154 and the middle portion 104. Preferably the grooves 160 are sized to receive the projections or ribs 208 that extend outward from the housing 204. See FIG. 5. The grooves 160 have a forward facing surface 162 and a rearward facing surface 164, which form a portion of the groove 160. The rearward facing surface 164 and the rearward facing surface 158 may be in the same plane. The forward facing surface 162 is to engage a rearward surface of the projections or ribs 208, while the rearward facing surface 164 will engage a forward facing surface of the projections or ribs 208. Thus, when one pulls on the flexible boot 100, the rearward facing surface 164 engages a forward facing surface of the projections or ribs 208, which releases the fiber optic connector 200 from the receptacle. Conversely, when the user pushes on the flexible boot 100, the forward facing surface 162 engages a rearward surface of the projections or ribs 208, and allows the fiber optic connector to be received in the receptacle. The attachment of the flexible boot 100 to the housing 204 allows for a pull strength of the order of 10N and a push strength of at least 20N.

Figure 6:
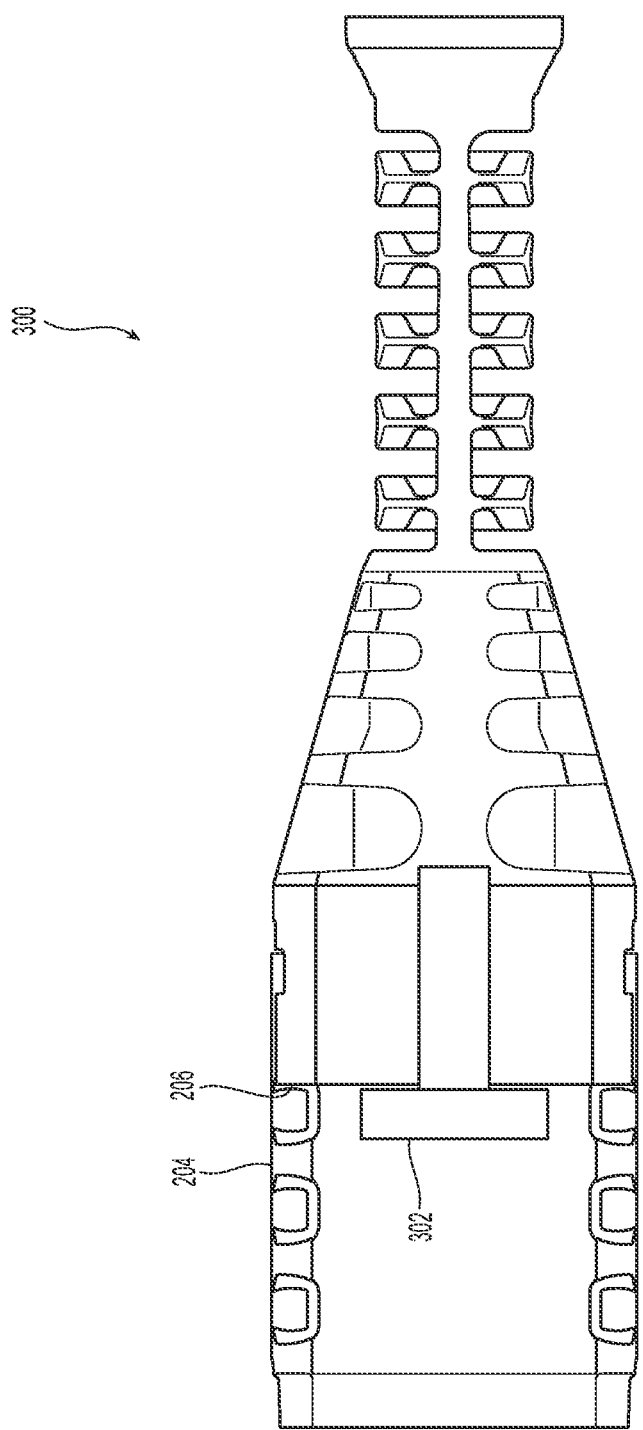
FIG. 6 is an alternative embodiment of a flexible boot for a fiber optic connector according to the present invention.

An alternative embodiment of a flexible boot 300 is illustrated in FIG. 6. In this embodiment, rather than the front extensions 108, there is a t-shaped extension 302 that extends across a portion of the housing 204. The t-shaped extension 302 would have projections that extend into the slots or openings 206 of the housing 204. There would be a similar extension on the underside of the connector illustrated in FIG. 6.

Figure 7:
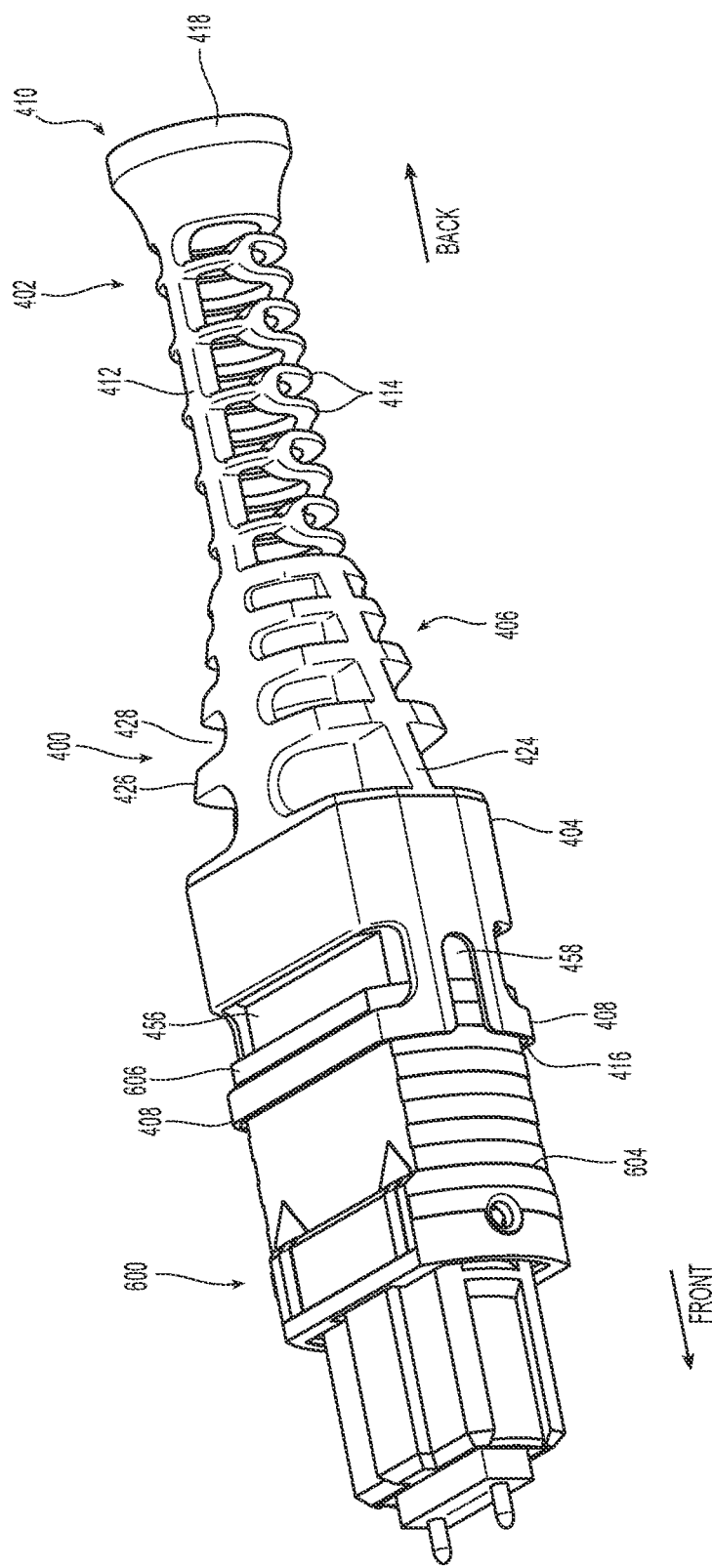
FIG. 7 is a perspective view of an embodiment of a push-pull boot for an MPO fiber optic connector according to the present invention, the push-pull boot attached to an MPO fiber optic connector.
Figure 8:
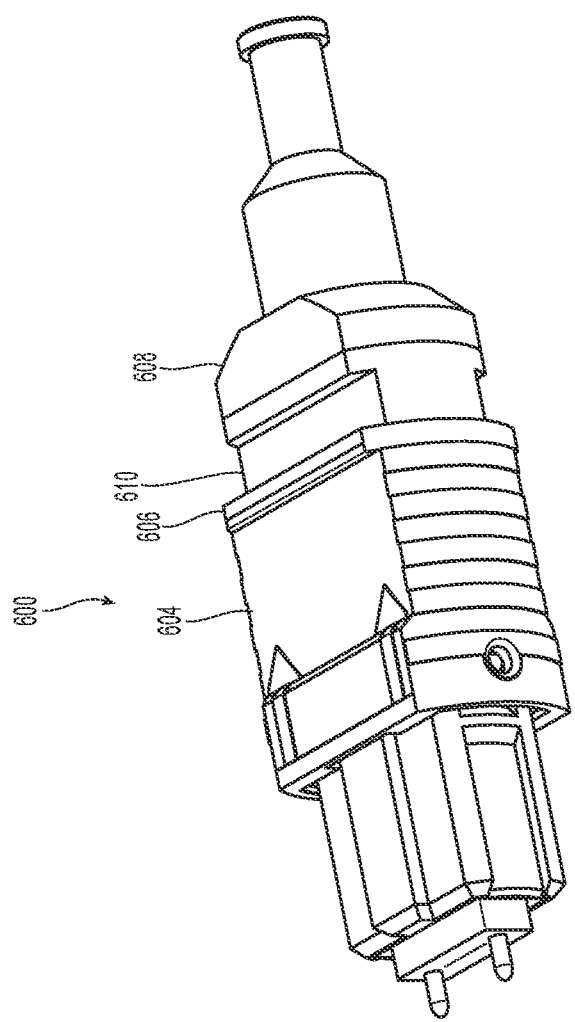
FIG. 8 is a perspective view of the MPO fiber optic connector in FIG. 7.

Another embodiment of a flexible boot 400 shown attached to an MPO fiber optic connector 600 is illustrated in FIG. 7. The flexible boot 400 is interchangeably referred to herein as a push-pull boot 400 for the MPO fiber optic connector. The MPO fiber optic connector 600 has an outer housing 604 (or sleeve), the outer housing 604 has a lip 606 around the rear end of the outer housing 604 that extends radially outward from the outer housing 604. The lip 606 may extend all the way around the periphery of the outer housing 604, or it may only extend around a portion thereof. However, the lip 606 needs to be present so as to engage the push-pull boot 400 as discussed below in detail. See FIG. 8. The lip 606 is typically a projection continuously running between the sides of the outer housing 604, although the lip 606 may alternatively be a discontinuous structure.

The push-pull boot 400 has a rear portion 402, a middle portion 404, a transition portion 406 disposed between the rear portion 402 and the middle portion 404, and a plurality of front extensions 408 extending forwardly from the middle portion 404 and away from the transition portion 406. See FIG. 9.

Figure 11:
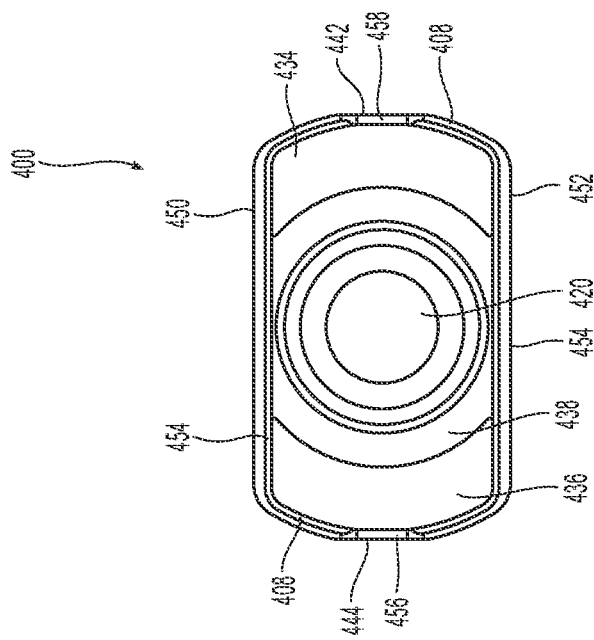
FIG. 11 is a front elevational view of the push-pull boot in FIG. 9.
Figure 10:
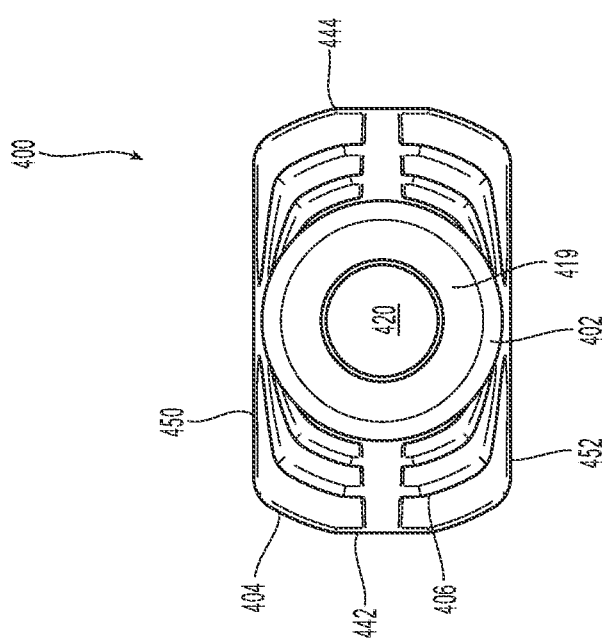
FIG. 10 is a rear elevational view of the push-pull boot in FIG. 9.

The rear portion 402 extends between a rear end 410 and the transition portion 406. The rear portion 402 has a spine 412 and a plurality of ribs 414. The spine 412 extends between the rear end 410 and the transition portion 406 and is parallel to the longitudinal axis A. See FIGS. 12 and 16. The plurality of ribs 414 generally extend around the rear portion 402. This configuration allows for the push-pull boot 400 to flex in all directions except along (or parallel to) the longitudinal axis A (FIG. 12) and towards the transition portion 406 and a front end 416 of the push-pull boot 400. As such, the push-pull boot 400 strain relieves the optical fiber cable containing the optical fibers. The push-pull boot 400 is used to push the MPO fiber optic connector 600 into an adapter or other receptacle, and to pull the MPO fiber optic connector 600 out of the adapter or the receptacle. The rear portion 402 also includes a grasping portion 418 at the rear end 410. As discussed in more detail below, the spine 412, the ribs 414, and the grasping portion 418 combine to form a portion of a central opening 420. See, e.g., FIGS. 10, 11, and 16.

Figure 14:
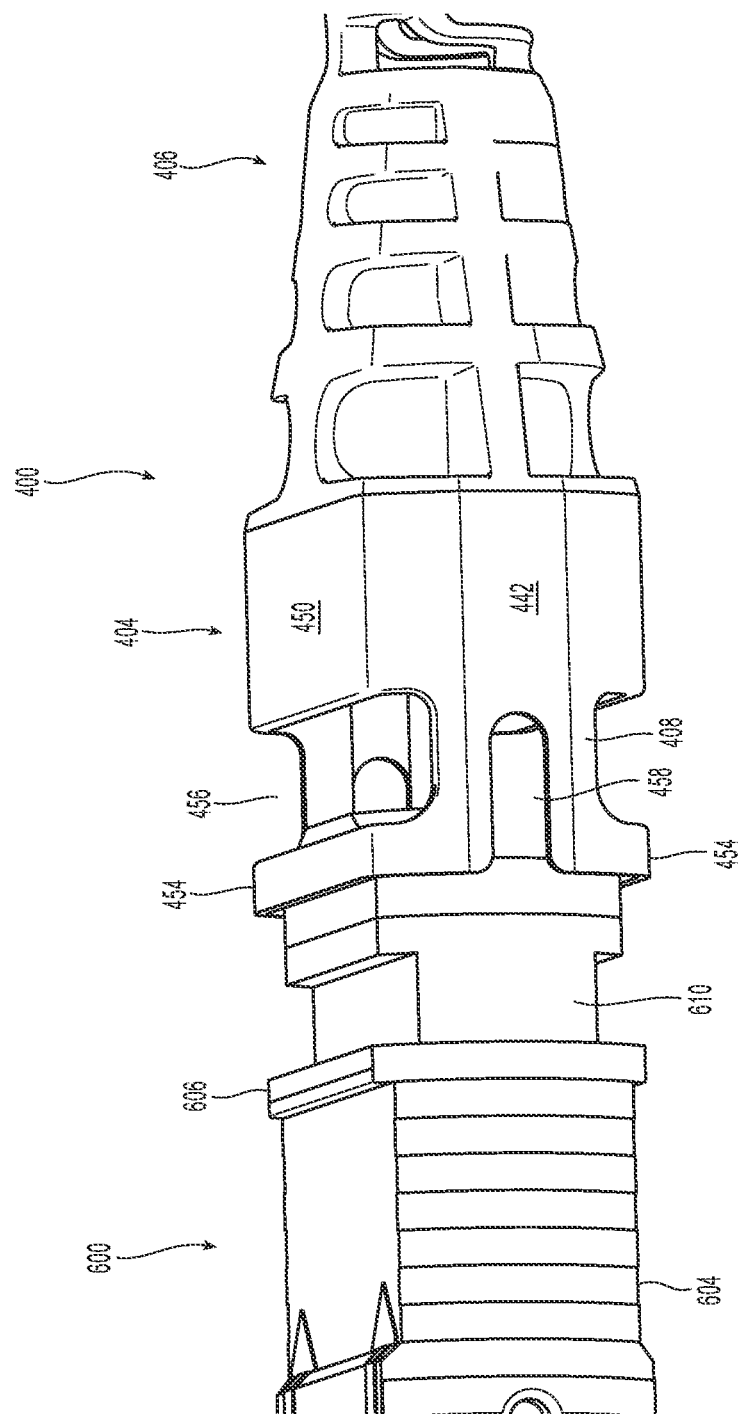
FIG. 14 is a side perspective view of the push-pull boot in FIG. 9 being positioned to engage the MPO fiber optic connector of FIG. 8.
Figure 15:
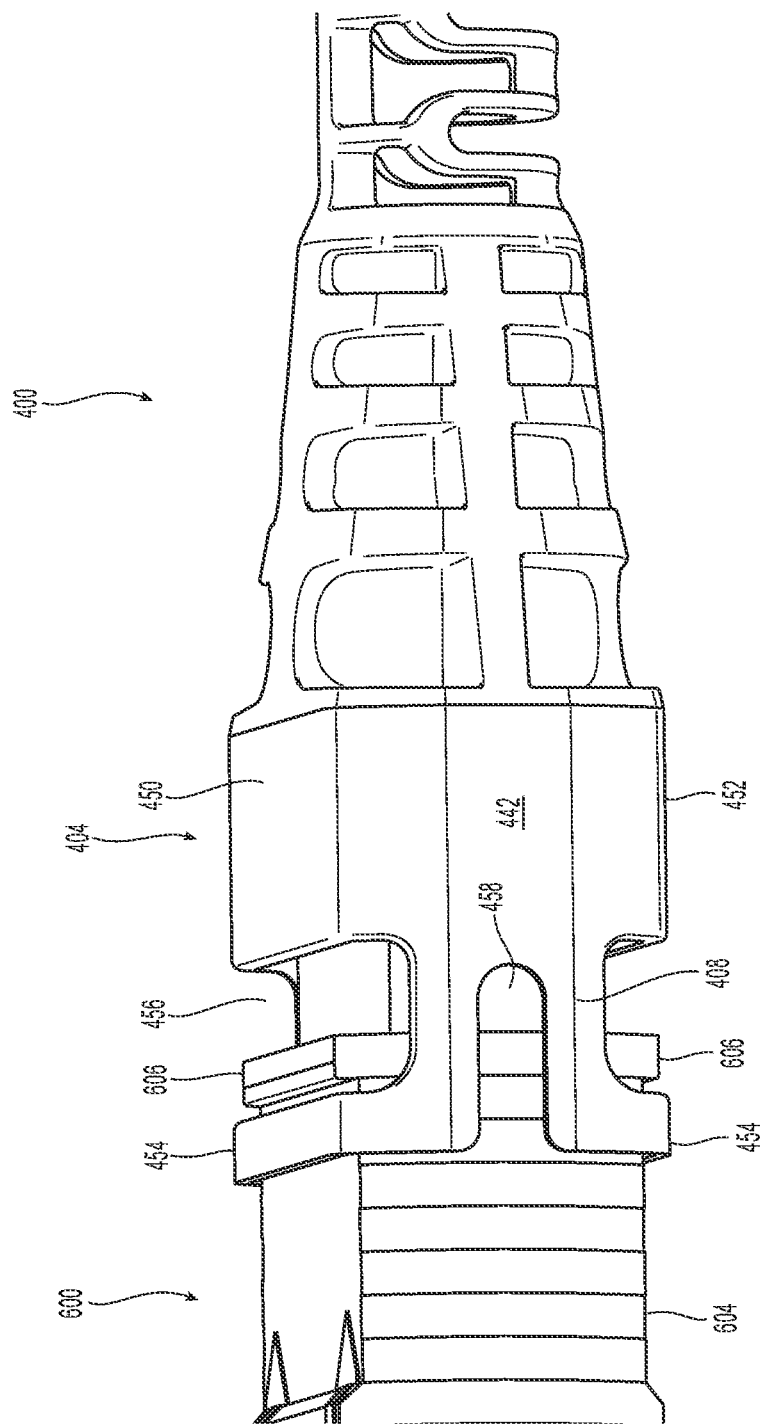
FIG. 15 is a side perspective view of the push-pull boot in FIG. 9 positioned on the MPO fiber optic connector of FIG. 8.

The transition portion 406 is disposed between the rear portion 402 and the middle portion 404. The transition portion 406 becomes larger moving from the rear portion 402 forward to the middle portion 404. Preferably, the exterior surface 422 has a number of central members 424 that extend from the rear portion 402 towards the middle portion 404 and generally in a direction parallel to the longitudinal axis A. The central members 424 have a plurality of cross members 426 extending therebetween. The cross members 426 generally extend around the transition portion 406 (and generally orthogonal to the longitudinal axis A) and have gaps 428 between each of the cross members 426. The transition portion 406 may also take other forms and configurations, e.g., different central members and cross members, as long as the push-pull boot does not flex parallel to the longitudinal axis A. See FIGS. 7 and 14.

Figure 9:
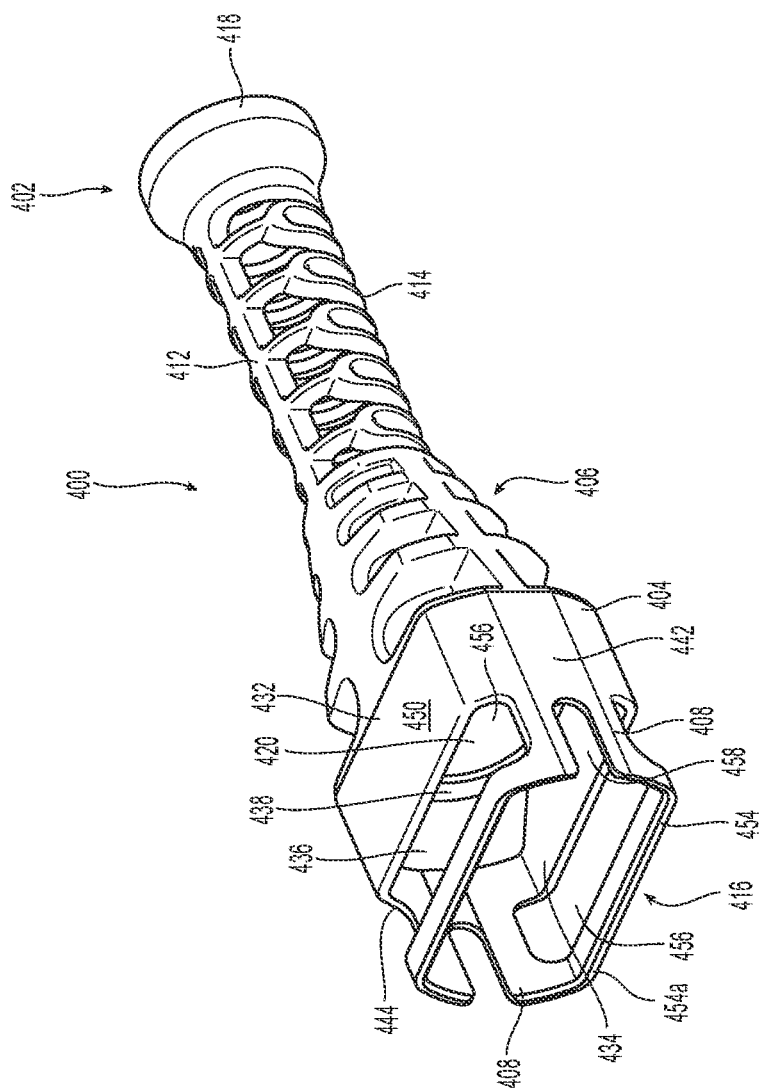
FIG. 9 is a perspective view of the push-pull boot in FIG. 7.
Figure 12:
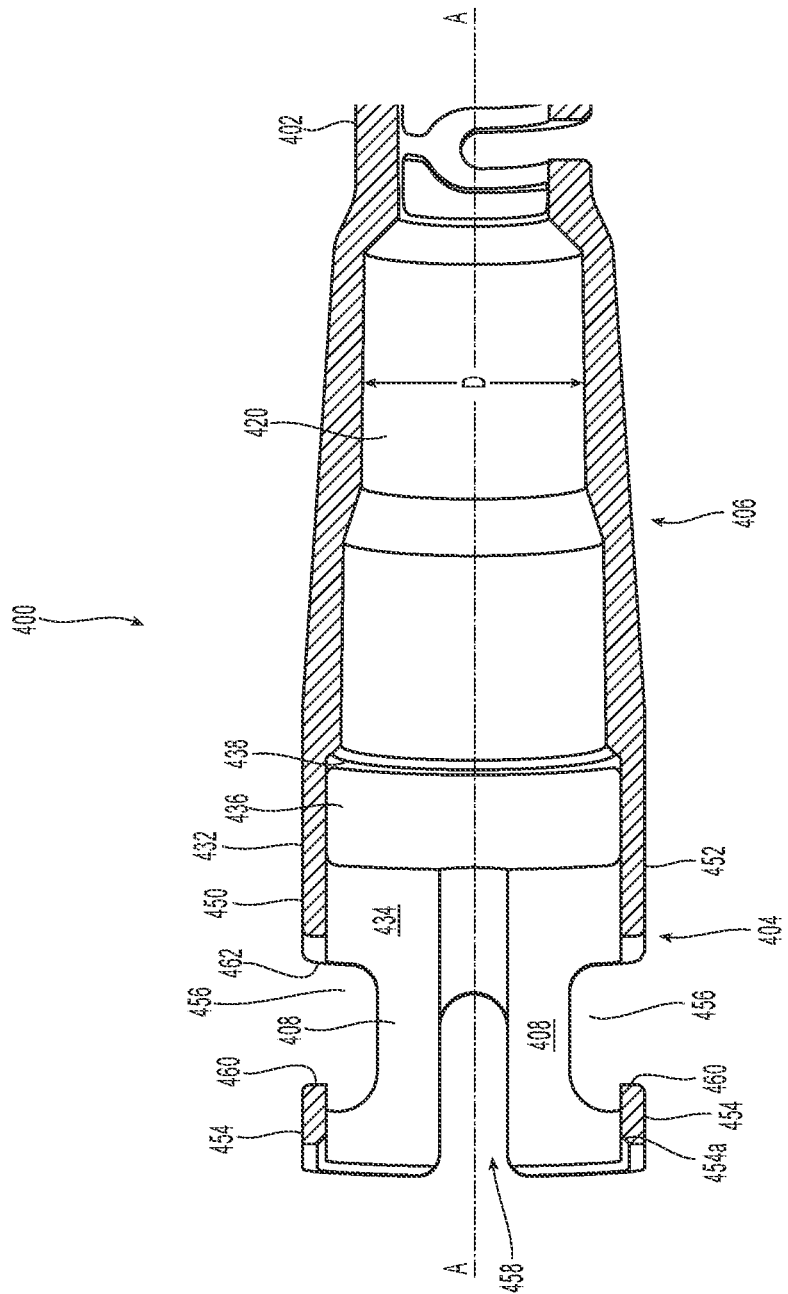
FIG. 12 is a cross sectional view of the push-pull boot in FIG. 9.
Figure 13:
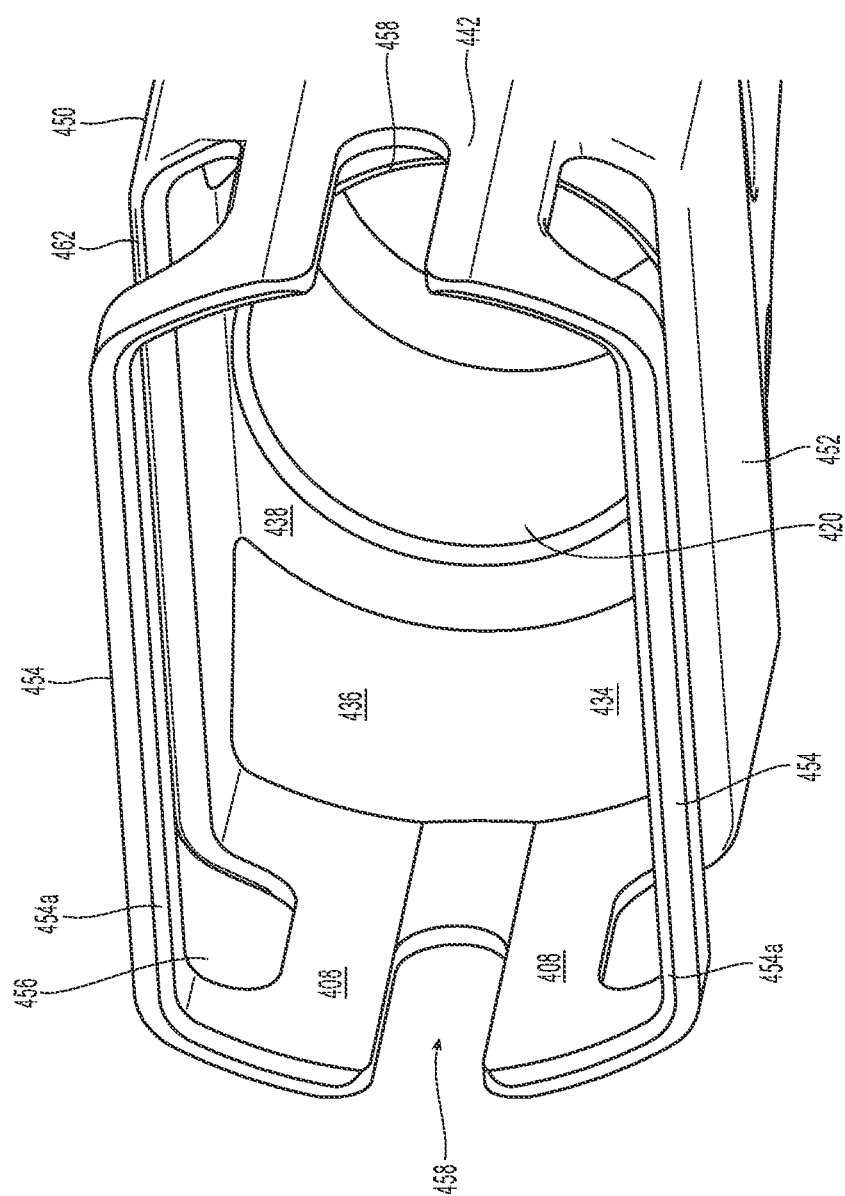
FIG. 13 is an enlarged perspective view from the bottom of the front of the push-pull boot in FIG. 9.

As seen in FIGS. 9 & 12, the transition portion 406 extends around the central opening 420 from the rear portion 402 through the transition portion 406. Preferably, the central opening 420 has a diameter D that varies along the length of the central opening 420. See FIG. 12. It is preferable that the diameter D decreases overall from the middle portion 404 to the rear end 410. See, e.g., FIGS. 12, 13, and 16. This reduction in diameter of the central opening 420 assists with the management of the optical fiber cable as it runs from the rear end 410 to the front end 416 of the push-pull boot 400. The central opening 420 will also accommodate a crimp body 612 about which a crimp band (not shown) may be placed (See FIG. 16).

Forward of the transition portion 406 is the middle portion 404. The middle portion 404 circumferentially surrounds the central opening 420, and has an outer surface 432 and an interior surface 434. The middle portion 404 also includes at least one forward facing surface 436. Preferably, there is a second forward facing surface 438 within the central opening 420. See FIGS. 12 and 13. The forward facing surfaces 436,438 are to engage the spring push 608 of the MPO fiber optic connector 600, as described in more detail below, to allow the MPO fiber optic connector 600 to be pushed into an adapter or other receptacle using the push-pull boot 400. See FIG. 16.

Extending forward from the middle portion 404 are a plurality of front extensions 408. As illustrated in the figures, the push-pull boot 400 has four of the front extensions 408. Two of the front extensions 408 extend from a first side 442 of the middle portion 404 and two of the front extensions 408 extend from a second side 444 of the middle portion 404. The first and second sides (442,444) are in reference to the shorter side of the push-pull boot 400 and the MPO fiber optic connector 600. These are referred to as the sides, rather than the top 450 and the bottom 452. These conventions are only for reference purposes and are not meant to be exclusionary. Extending between the front extensions 408 is at least one, and more likely two, cross bars 454. The push-pull boot 400 preferably has a gap or opening 456 that is disposed between the middle portion 404 and the cross bars 454. The cross bars 454 extend across the top and bottom sides 450,452, but could extend along the first and second sides (442,444) if the MPO fiber optic connector 600 had a different configuration for the lip 606 as discussed below. The cross bars 454 are generally perpendicular to the longitudinal axis A. Further, the cross bars may not extend all the way between the front extensions 408 on opposite first side 442 and the second side 444. Instead, the cross bars 454 may be discontinuous. That is, a respective cross bar 454 may extend from each of the front extensions 408 inward partially towards the opposite side but may not join the front extension on the other side and still provide the same function as above.

It should be noted that there are also gaps or openings 458 between the front extensions 408 on the first and second sides (442,444). The gaps or openings 458 could be of a different size, shape or length and still fall within the scope of the present invention. The gaps or openings 458 generally allow for the push-pull boot 400 to be inserted over the MPO fiber optic connector 600 and the lip 606 from the back end of the MPO fiber optic connector 600. See FIG. 14. The gap or opening 456 also receives a portion of the lip 606. The cross bars 454 also have a chamfered surface 454a that assists in engaging and sliding over the lip 606. Once past the lip 606, the cross bars 454 (and the extensions) will move toward the outer housing 604, movably or slidably retaining the MPO fiber optic connector 600 in the MPO fiber optic connector 600. See FIGS. 7, 15, and 17-18.

It should also be noted that rather than the four forward extensions 408 and two cross bars 454, there may only be two extensions 408 and one cross bar 454. For example, there may be two forward extensions 408 provided only on the top side 450, but none on the bottom side 452.

Turning to FIGS. 12, 15, 16, and 18, the cross bars 454 have a rear facing surface 460 to engage the outer housing 604 (or sleeve), and in particular a forward facing surface 606a on the lip 606. See FIGS. 15, 16, and 18 in particular. As is known in the art, when the MPO connector is grasped and pulled rearward using the outer housing 604, the MPO fiber optic connector 600 will be released from the adapter or receptacle. As illustrated, when the push-pull boot 400 is pulled rearward, the rear facing surface 460 engages the outer housing 604, and in particular the lip 606, causing the MPO fiber optic connector 600 to be released due to the outer housing 604 moving rearward and away from the adapter or another type of a receptacle.

The push-pull boot 400 has a forward facing surface 462 in the middle portion 404 that may be used to install the MPO fiber optic connector 600 in an adapter or other receptacle. See FIG. 17. As the push-pull boot 400 is used to install the MPO fiber optic connector 600, the forward facing surface 462 may engage the rear portion of the lip 606 to assist in the securing of the MPO fiber optic connector 600 in an adapter or other receptacle.

Figure 16:
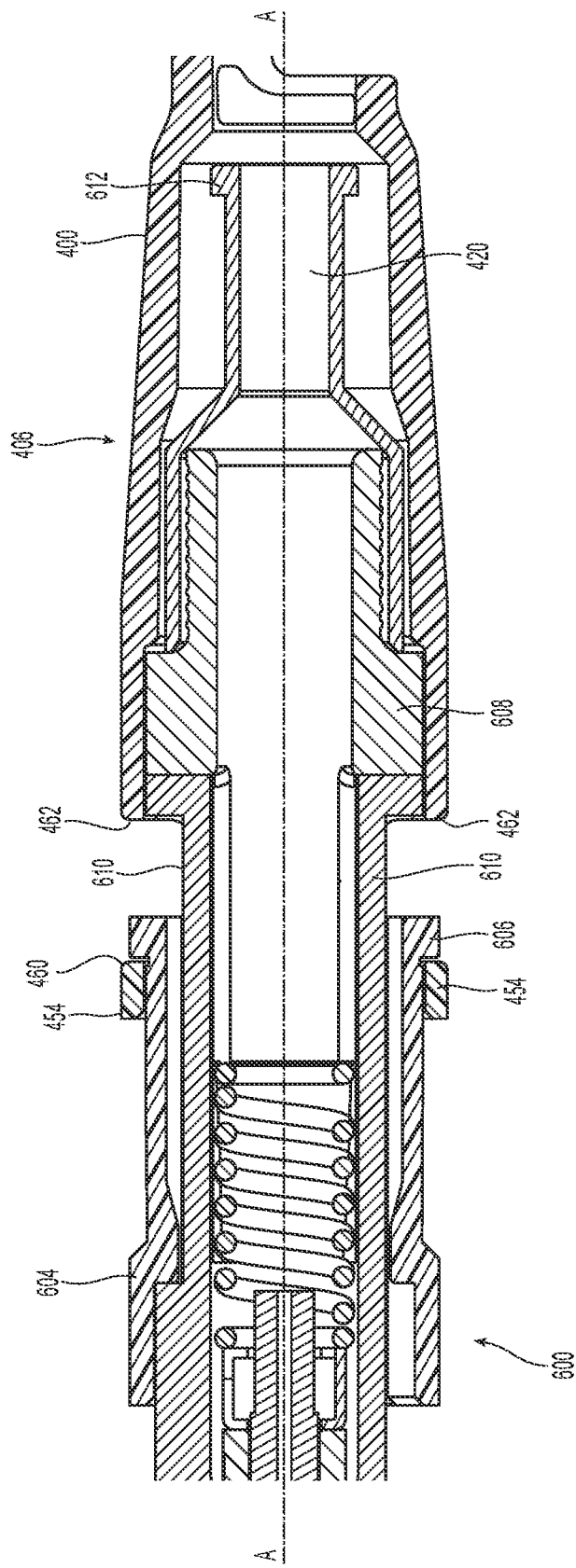
FIG. 16 is a side elevation view of a cross section of the combination of the push-pull boot and the MPO fiber optic connector with the push-pull boot engaging the spring push in the MPO fiber optic connector.
Figure 17:
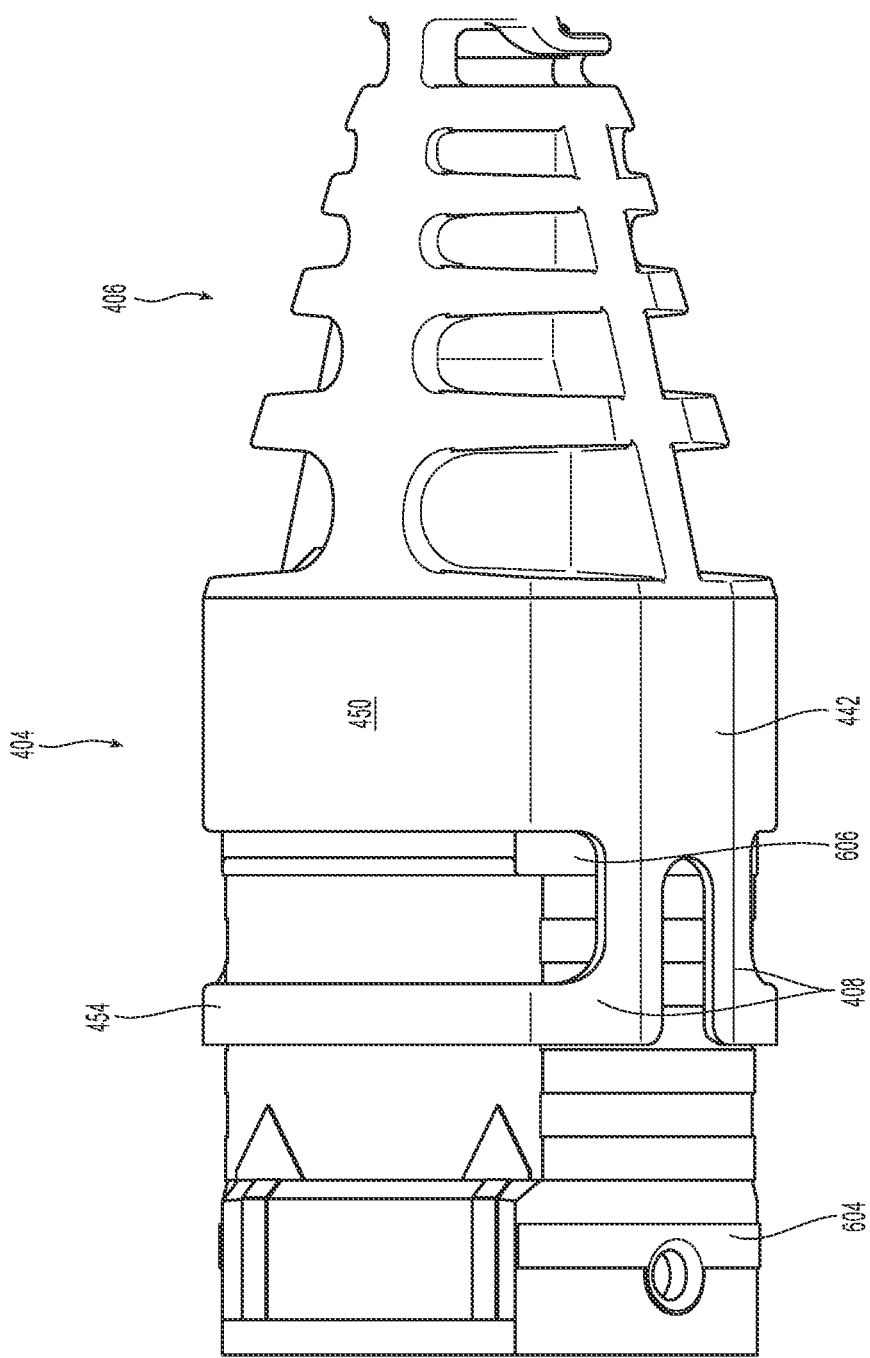
FIG. 17 is a side perspective view of the push-pull boot and the MPO fiber optic connector of FIG. 16.
Figure 18:
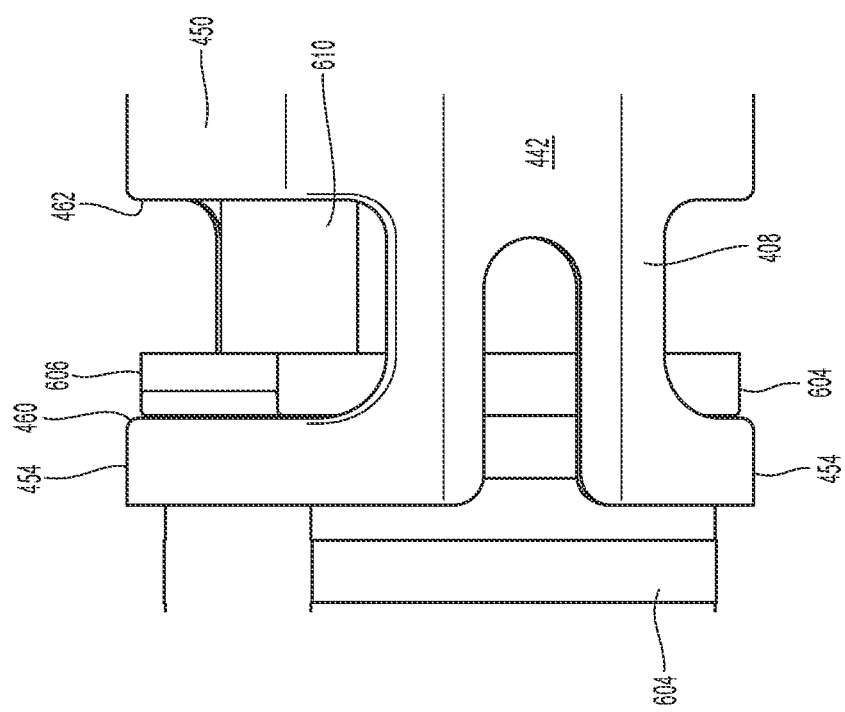
FIG. 18 is a side perspective view of the push-pull boot in FIG. 9 positioned to engage the forward facing surface of the housing of the MPO fiber optic connector of FIG. 17.

To install the MPO fiber optic connector 600 in an adapter or other receptacle, it is, as noted above, the spring push 608 of the MPO fiber optic connector 600 engaging the forward facing surfaces 436,438 of the push-pull boot 400. With reference to FIGS. 13-16, the attachment of the MPO fiber optic connector 600 will be discussed. The MPO fiber optic connector 600 also has an inner housing 610, which is at least partially inside of the outer housing 604. The spring push 608 is at least partially within the inner housing 610 and extends out the back end thereof. In FIG. 16, there is also a crimp body 612 about which a crimp band is installed to secure the optical fiber cable, as is known in the art. As noted above, the push-pull boot 400 has forward facing surfaces 436,438 that engage the rear end of the spring push 608. The spring push 608 is biased against the rear of the inner housing 610, so that when the spring push is moved forward, so is the inner housing 610 and the rest of the MPO fiber optic connector 600. As is known, the inner housing 610 is the structure that engages the adapter or other receptacle. Thus, moving the inner housing 610 forward moves the MPO fiber optic connector 600. The cross bars 454 will move with the push-pull boot 400 and slide over the outer housing 604.

Figure 19:
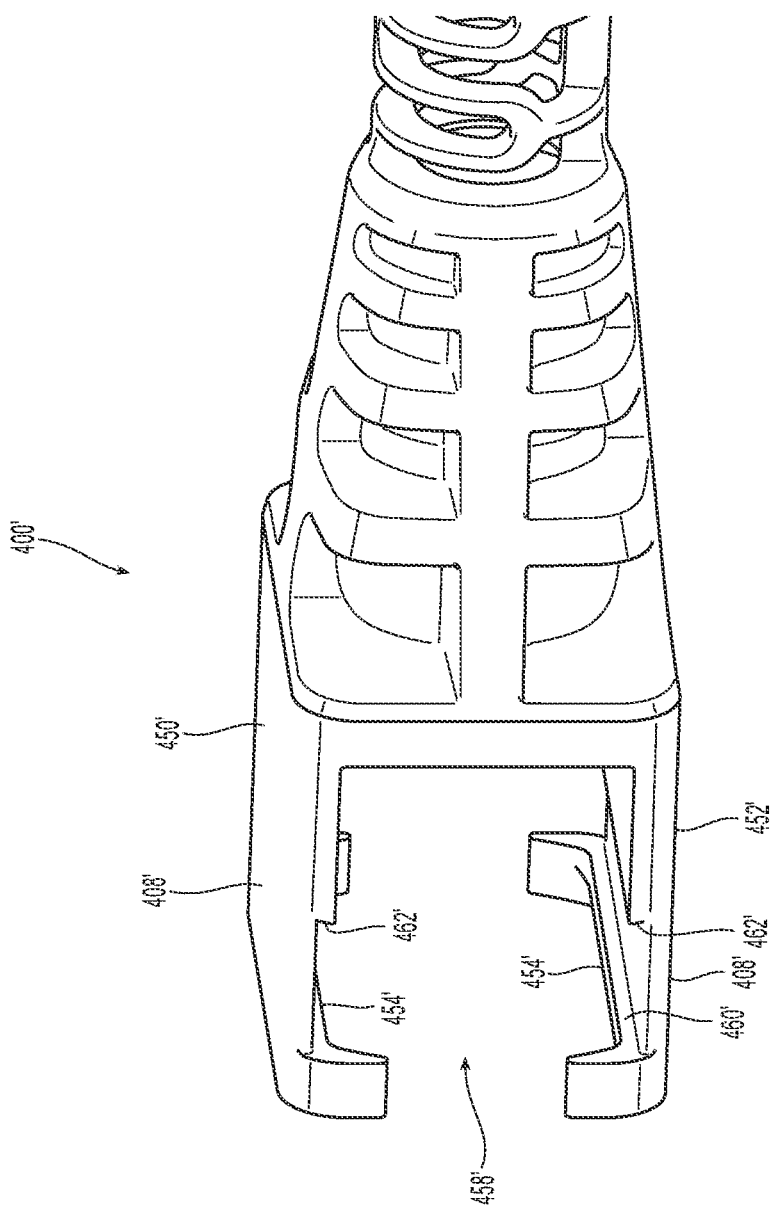
FIG. 19 is a side perspective view of another embodiment of a push-pull boot according to the present invention.
Figure 20:
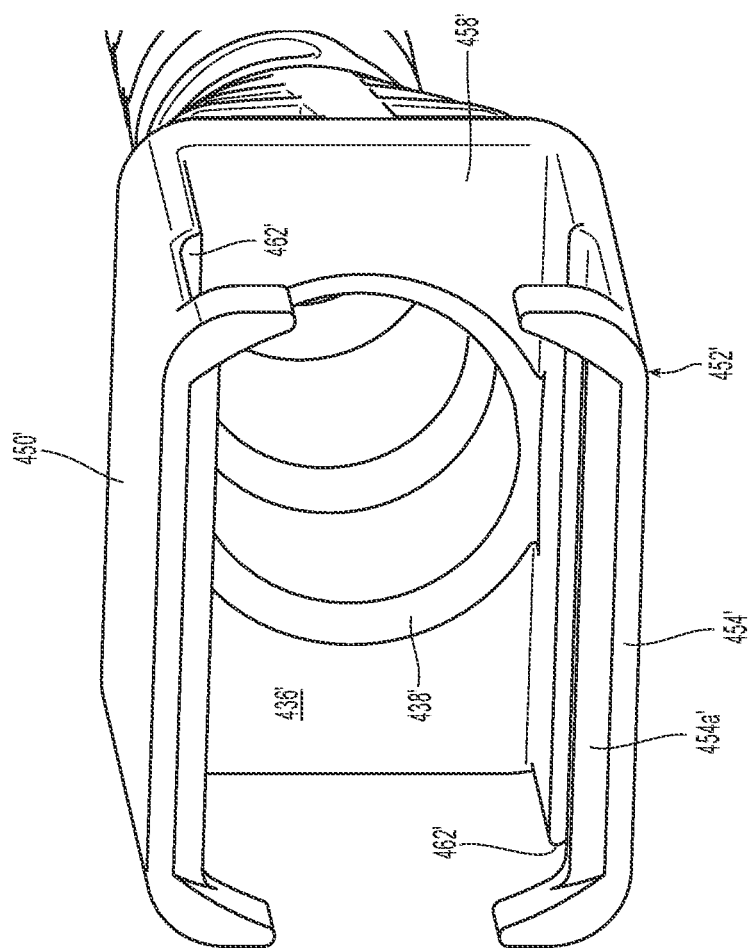
FIG. 20 is a front perspective view of the push-pull boot in FIG. 19.
Figure 21:
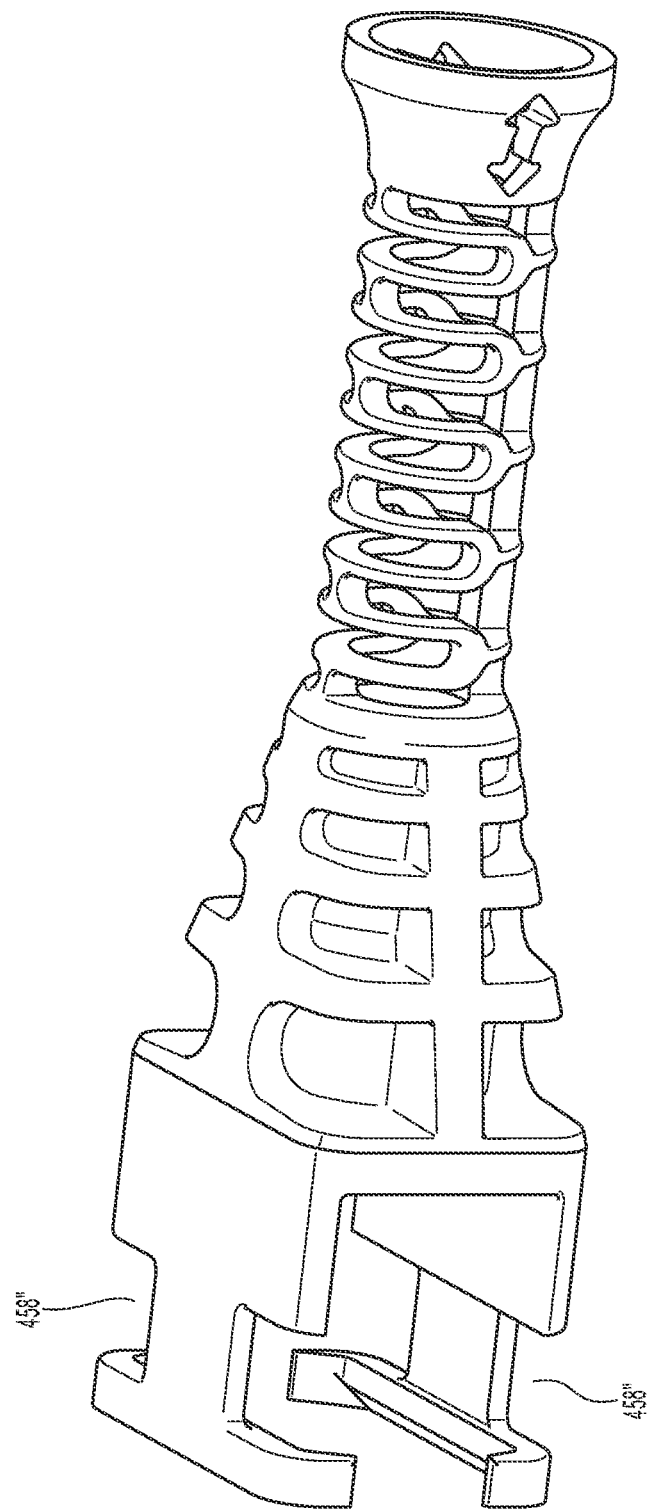
FIG. 21 is a side perspective view of a third embodiment of a push-pull boot according to the present invention.

Another embodiment of a push-pull boot 400' is illustrated in FIGS. 19 and 20. In this embodiment, the rear portion, middle portion, and transition portion are the same as in the prior embodiment. There are also a plurality of front extensions 408' extending away from the middle portion. However, the front extensions are preferably solid on the top and bottom sides 450',452', but there also could be openings or gaps therein as well (e.g., the gaps 458" as shown in the third embodiment in FIG. 21). The side gaps 458' between the front extensions 408' are considerably larger, to allow for flexing of the front extensions 408' to be installed on the MPO fiber optic connector 600. The front extensions 408' have a cross bar 454' with a rear facing surface 460' to engage the outer housing 604. Again, the cross bar 454' may be a discontinuous structure between the front extensions 408'. The front extensions 408' also may have a forward facing surface 462' as with the prior embodiment. The push-pull boot 400' also has forward facing surfaces 436', 438' that engage the rear end of the spring push 608. However, the forward facing surfaces 436',438' are preferably larger than that in the prior embodiment.

Figure 22:
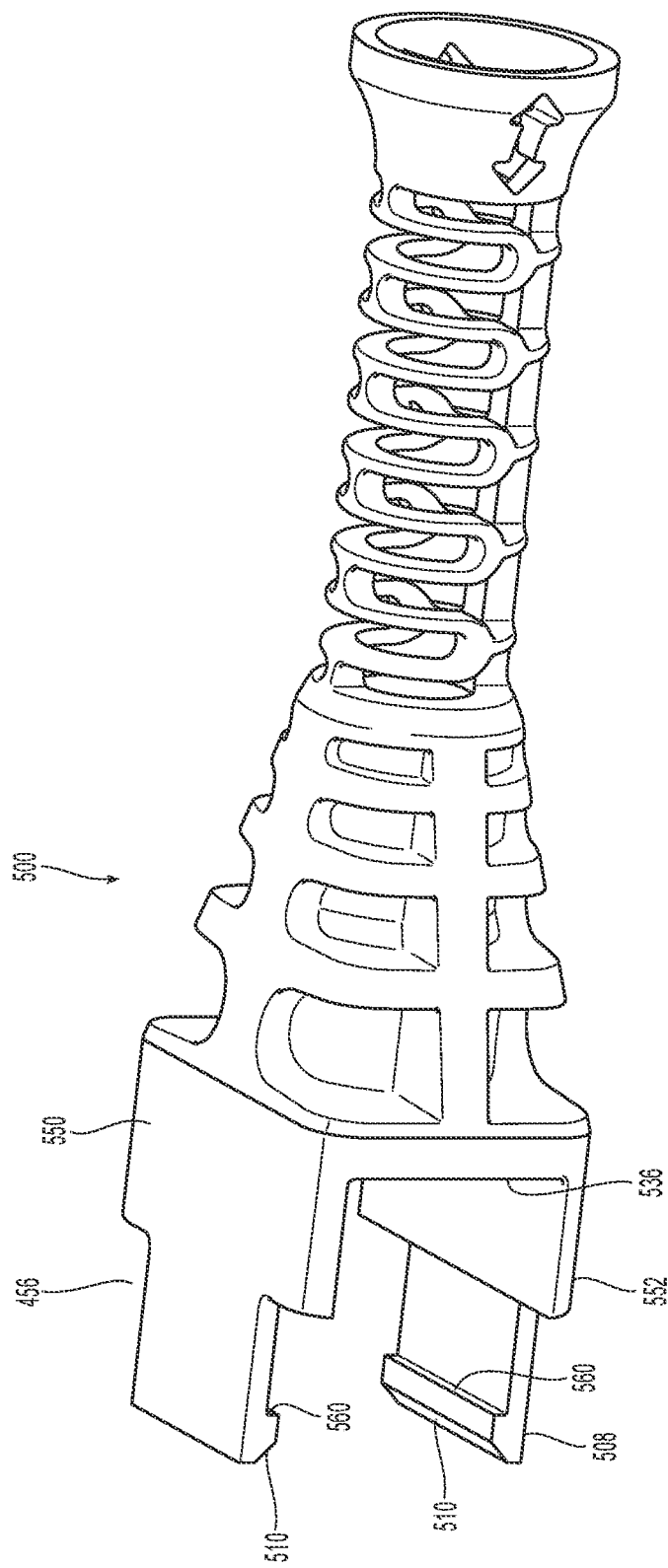
FIG. 22 is a side perspective view of a fourth embodiment of a push-pull boot according to the present invention.

Yet another embodiment of a push-pull boot 500 according to the present invention is illustrated in FIG. 22. In this embodiment, the rear portion, middle portion, and transition portion are the same as in the prior embodiments. However, instead of the front extensions 408' being a continuation of the top and bottom sides 450',452' as in the previous embodiment, in this embodiment the forward extensions 508 are formed as cantilevered latches from the top and bottom sides 550, 552. Each of the front extensions 508 has a chamfer 510 to guide the push-pull boot 500 over the lip 606 during installation on the MPO fiber optic connector 600. Once past the lip 606, the extensions 508 each have a rear facing surface 560 (similar to the rear facing surface 460) to engage a forward facing surface of the lip 606. There could be more than one such forward extension 508 extending from the top and bottom sides 550,552, respectively. Alternatively, there may be additional extensions from the sides that are joined to the forward facing surfaces 536 that engage the spring push 608. For example, there may be other forward facing surfaces like 466,438 in the prior embodiment. Yet alternatively, the extensions 508 may only be present on the sides, with some gap between the top and bottom sides 550, 552 and those extensions.

Accordingly, various aspects of this disclosure provide a push-pull boot (e.g., the push-pull boot 400) that has a rear facing surface (e.g., the rear facing surface 460) to engage the outer housing 604 to pull the MPO fiber optic connector 600 out of engagement with an adapter or another receptacle. The rear facing surface may be provided at different locations as described in the aforementioned embodiments and are not limited to specific locations on the forward extensions. The MPO fiber optic connector 600 may then be pushed back into the adapter by engaging the spring push 608 and pushing on the push-pull boot 400 or 500 or pushing on the MPO fiber optic connector 600.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A push-pull boot for an MPO fiber optic connector, the MPO fiber optic connector having an outer housing, the push-pull boot comprising:
    a rear portion;
    a middle portion;
    a transition portion between the middle portion and the rear portion;
    at least two front extensions extending forwardly from the middle portion and away from the transition portion; and
    at least one cross bar between the at least two front extensions, the push-pull boot having a rear facing surface on the at least one cross bar to engage the outer housing of the MPO fiber optic connector, wherein the push-pull boot has a longitudinal axis and is flexible in a direction away from the longitudinal axis between an end of the rear portion to the transition portion and is not flexible in a direction parallel to the longitudinal axis.

2. The push-pull boot according to claim 1, wherein the at least two front extensions comprise four front extensions extending forwardly from the middle portion and the at least one cross bar comprises two cross bars, a first of the two cross bars joining two different front extensions than a second of the two cross bars.

3. The push-pull boot according to claim 1, wherein the at least one cross bar joins the at least two front extensions.

4. The push-pull boot according to claim 1, wherein the at least two front extensions include only two front extensions on a same side of the middle portion and the at least one cross bar includes only one cross bar between the only two front extensions.

5. The push-pull boot according to claim 1, wherein the rear facing surface is configured to engage a forward facing surface on the outer housing during a pulling operation.

6. The push-pull boot according to claim 5, wherein the forward facing surface is on a lip of the outer housing at a rear end of the outer housing.

7. The push-pull boot according to claim 1, wherein the push-pull boot has a longitudinal axis and a spine extending from an end of the rear portion to the transition portion and parallel to the longitudinal axis.

8. The push-pull boot of claim 1, further comprising a spring push seat located in the middle portion of the push-pull boot and configured to engage a spring push of the MPO fiber optic connector during a pushing operation of the MPO fiber optic connector.

9. A push-pull boot for an MPO fiber optic connector, the MPO fiber optic connector having an outer housing, the push-pull boot comprising:
    a rear portion;
    a middle portion;
    a transition portion between the middle portion and the rear portion;
    a plurality of front extensions extending forwardly from the middle portion; and
    two cross bars, each cross bar joining two of the plurality of front extensions to each other, the push-pull boot having at least one rear facing surface to engage the outer housing of the MPO fiber optic connector, wherein the push-pull boot has a longitudinal axis and is flexible in a direction away from the longitudinal axis between an end of the rear portion to the transition portion and is not flexible in a direction parallel to the longitudinal axis.

10. The push-pull boot according to claim 9, wherein the at least one rear facing surface engages the outer housing at a forward facing surface on a longer side of the outer housing.

11. The push-pull boot according to claim 9, wherein the plurality of front extensions comprise four front extensions extending forwardly from the middle portion and a first of the two cross bars joining two different front extensions than a second of the two cross bars.

12. The push-pull boot according to claim 9, wherein the rear facing surface is provided on each of the cross bars, and both of the two cross bars are configured to engage forward facing surfaces on the outer housing during a pulling operation.

13. The push-pull boot according to claim 9, wherein the forward facing surfaces are on two lips of the outer housing at a rear end of the outer housing.

14. The push-pull boot of claim 9, further comprising a spring push seat located in the middle portion of the push-pull boot and configured to engage a spring push of the MPO fiber optic connector during a pushing operation of the MPO fiber optic connector.

15. A push-pull boot for an MPO fiber optic connector, the MPO fiber optic connector having an outer housing, the push-pull boot comprising:
    a rear portion;
    a transition portion forward of the rear portion;
    a middle portion forward of the transition portion; and
    a pair of front extensions extending forwardly from a top side and a bottom side of the middle portion, the push-pull boot having a rear facing surface at a front end of the front extensions to engage a forward facing surface of the outer housing of the MPO fiber optic connector, the outer housing having no openings on an outer surface thereof where the push-pull boot engages the outer housing,
    wherein the push-pull boot has a longitudinal axis and is flexible in a direction away from the longitudinal axis between an end of the rear portion to the transition portion and is not flexible in a direction parallel to the longitudinal axis.

16. The push-pull boot of claim 15, wherein the pair of front extensions include a rear facing surface to engage the outer housing of the MPO connector during a pulling operation.

* * * * *